Aug. 24, 1965
E. F. HEISER
3,202,411
FLUID SPRING SYSTEM
Filed Oct. 11, 1963
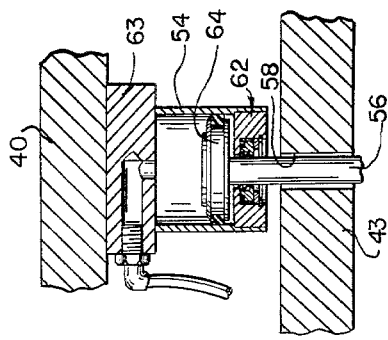
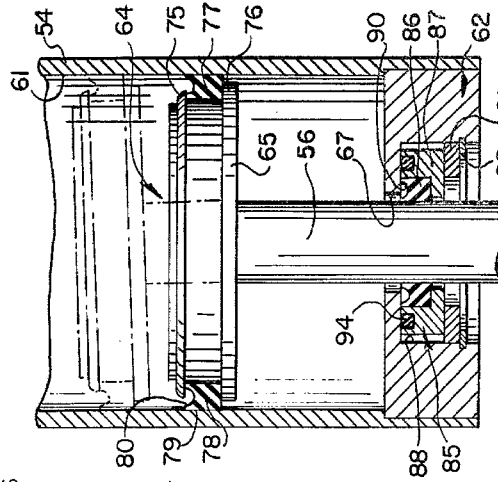
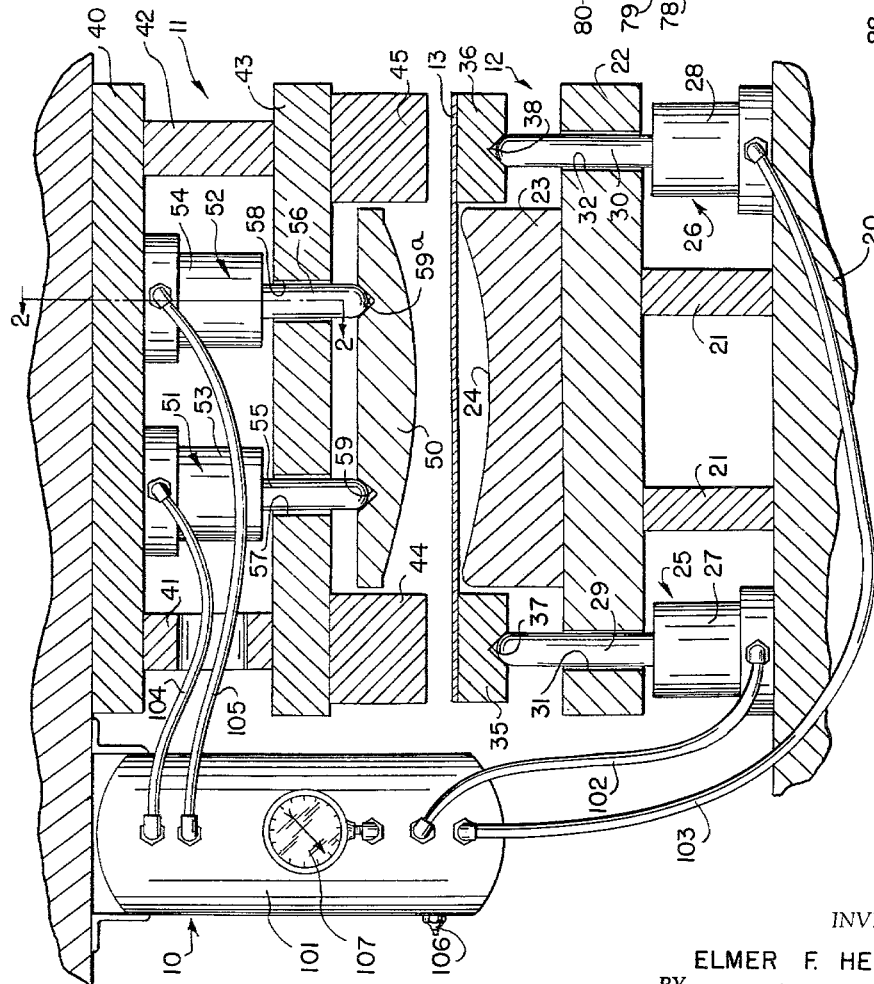
INVENTOR.
ELMER F. HEISER
BY
Williams, David,
Hoffmann & Yount
ATTORNEYS United States Patent Office 3,202,411
Patented Aug. 24, 1965

3,202,411
FLUID SPRING SYSTEM
Elmer F. Heiser, 5880 Lotusdale Drive,
Parma Heights 30, Ohio
Filed Oct. 11, 1963, Ser. No. 315,549
5 Claims. (Cl. 267—1)

The present invention relates to a fluid spring system, and particularly to a fluid spring system having a fluid spring means yieldably resisting relative movement between die members. In such systems the fluid spring means is normally biased by a fluid pressure and suitable fluid conduits connect the fluid spring means to a reservoir or source of fluid pressure.

The present application is a continuation-in-part of my co-pending applications Serial Nos. 187,070 and 149,405, filed April 12, 1962 and Nov. 1, 1961, respectively.

Prior art fluid spring systems having fluid spring means yieldably resisting relative movement between die members have not been satisfactory in operation and have been relatively complex. One prior art system using a compressible fluid as the fluid pressure medium is an air system which includes an air compressor to supply an unlimited volume of air to the system. The air compressor in such a system is ineffective to provide sufficiently high pressures in the system. Such systems normally operate with a maximum pressure of about 80 to 90 p.s.i. and the size of the fluid spring means must often be quite large to provide the desired force. Moreover, the air compressor introduces oil into the air lines which provides a barrier or resistance to the smooth flow of air and causes considerable heat to be generated. Furthermore, air as the fluid medium has disadvantages which make it more desirable to use an inert gas.

In known fluid systems using a noncompressible fluid, such as hydraulic fluid, high pressures have been achieved. However, since fluid in these systems is noncompressible, problems of providing for fluid flow into and from the fluid springs are encountered when the pressure of the fluid is under 1000 p.s.i. Moreover, the hydraulic systems require complex piping and valving in order to handle the fluid flowing into and from the fluid spring. These systems also, in order to prevent substantial build-up of pressure in the system when the fluid spring contracts, have included a relief valve which operates to open the fluid conduit in which it is located when the pressure therein reaches a certain level, and are normally called resistance systems. The fluid flows back into the fluid spring means through a suitable check valve in these systems. The resistance systems require dissipation of heat generated by the resistance action of the connection between the fluid spring and the reservoir. Also problems have been encountered in returning the fluid to the spring means so that the spring means will return when the pressure against which it yielded is released. Moreover the amount of fluid which must often be displaced in this type of system presents problems in piping through the die members. Furthermore even in the hydraulic systems it has been necessary to provide for an unlimited volume of fluid by connecting a source of hydraulic fluid in the system to add hydraulic fluid to the system.

Accordingly, the principal object of the present invention is the provision of a simplified fluid spring system including a fluid spring means yieldably resisting relative movement between two die members and wherein the fluid spring system is reliable in operation, highly simplified, and normally under a relatively high pressure.

A further object of the present invention is the provision of a new and improved fluid spring system wherein the system is closed in that only a limited volume of a fluid medium is maintained in the system and the system requires no source of fluid normally connected thereto.

A further object of the present invention is the provision of a new and improved fluid spring system having a fluid pressure substantially in excess of 90 p.s.i. and wherein the fluid handling system is extremely simplified and the amount and size of the piping or fluid conduits for handling the fluid is held to a minimum and the fluid handling system is free of relief and check valves located between the reservoir tank and the fluid springs.

A further object of the present invention is the provision of a new and improved fluid spring system including fluid spring means for yieldably resisting movement between relatively movable die members and wherein the system is a compressible fluid system having a limited volume of fluid and a relatively high pressure maximum as opposed to known compressible fluid systems having an unlimited volume and a relatively low pressure maximum.

A further object of the present invention is the provision of a new and improved limited volume fluid spring system having fluid spring means for yieldably resisting relative movement between die members and wherein the fluid spring means are piston cylinder devices of the self-aligning type and are provided with a fluid force for yieldably resisting relative movement of the die members by a closed fluid system having a limited volume of fluid.

A further object of the present invention is the provision of a new and improved fluid spring system having self-aligning fluid spring means of the piston cylinder type and a single fluid conduit connecting the cylinder of the fluid spring means with a fluid reservoir so that the fluid going to and from the reservoir travels through the same identical paths or conduits.

A further object of the present invention is the provision of a new and improved fluid spring system having self-aligning spring means and wherein the spring means yieldably resists relative movement between relatively movable material forming members and includes a piston head which may tilt in the bore of a cylinder to allow a piston rod fixed thereto to move angularly as the outer end of the piston rod is constrained to move along a line different from the cylinder axis.

Further objects and advantages of the present invention will be apparent from the detailed description thereof made hereinbelow with reference to the accompanying drawings forming a part of this application and in which, FIG. 1 is a cross-sectional view illustrating an apparatus embodying the present invention;

FIG. 2 is a cross-sectional view taken approximately on the section line 2—2 of FIG. 1; and FIG. 3 is an enlarged detailed sectional view of a portion of the fluid spring shown in FIG. 2.

The present invention relates to a fluid spring system including a fluid spring means for yieldably resisting relative movement between two members. Such systems normally form a part of a sheet metal forming press which has cooperating die means which, upon relative movement, shape or form the sheet material positioned therebetween. The fluid spring means functions to cushion or yieldably resist relative movement between die members during the forming of the material for a well known purpose.

The preferred embodiment of the present invention is shown in FIG. 1 where in a sheet metal forming press 10 is illustrated. The sheet metal forming press 10 includes upper die means 11 and lower die means 12 which cooperate to effect the forming of metal sheet material 13 positioned therebetween. The press 10 also includes suitable power mechanism to effect relative movement between the upper die means 11 and the lower die means 12 so as to cause the die means 11, 12 to cooperate to form the sheet material 13. This mechanism may be of any conventional construction and is not shown herein nor will it be described.

The lower die means 12 includes a horizontally extending support die member 20 connected by suitable vertically extending spaced rib members 21 to a horizontal support member 22. A lower material forming die member 23 is carried by the support member 22 centrally thereof and has a concave recess 24 in the upper surface thereof into which the material is formed by the upper die means 11, as will be described in detail hereinbelow.

The lower die means 12 also includes fluid spring means comprising a pair of fluid springs 25 and 26 supported at spaced locations by the support member 20. The fluid springs 25, 26 include cylinder members 27, 28, respectively, and piston rods 29, 30, respectively, which extend outwardly of the cylinders 27, 28 and through suitable openings 31, 32, respectively, in the support member 22. The outer end of the piston rods 29, 30 are connected to work holding members 35, 36, respectively, located on opposite sides of the die members 23. The connection of the outer end of the piston rods 29, 30 to the members 35, 36 is such as to permit universal pivotal or rocking movement of the outer ends of the piston rods 29, 30 relative to the members 35, 36, respectively. Specifically, the outer ends of the piston rods 29, 30 are received in conical seats 37, 38, respectively, in members 35, 36, respectively. The work holder members 35, 36 are biased and normally held in the position shown in FIG. 1 so as to extend above the uppermost portion of the die member 23 by the fluid springs 25 and 26.

The upper die member 11 includes a suitable support die member 40 connected by support rib members 41 and 42 extending from the support member 40 to a horizontally extending support member 43 spaced from the support member 40. The support member 43 has a pair of laterally spaced material forming members 44, 45, respectively, which are of substantially the same horizontal dimension as the workholder members 35, 36 and function to clamp the sheet material 13 down against the workholder members 35, 36 upon relative movement between the upper die means and the lower die means. The upper die means 11 also includes a die member 50 which is positioned between the members 44 and 45 and is normally maintained in a conventional manner in the position shown in FIG. 1 so as to trail the movement of the members 44, 45.

The die member 50 is associated with a pair of fluid springs 51, 52 which have cylinder members 53, 54, respectively, secured to the support member 40. The cylinder members 53, 54 have piston rods 55, 56, respectively, extending therefrom and through openings 57, 58, respectively, in the horizontally extending support member 43. The outer ends of the piston rods 55, 56, respectively, are associated with the die member 50 to permit universal pivotal or rocking movement of the outer end of the piston rods 55, 56 relative to the die member 50. Specifically, the outer ends of the piston rods 55, 56 are received in conical seats 59, 59a, respectively, in the die member 50. The fluid springs 51, 52 bias the die member 50 to the position shown in FIG. 1. It will be noted that the piston rods 55, 56 are mechanically free of the die member 50 for movement relative thereto along the axis of the cylinder in a direction away from the die member.

Upon relative movement between the die means 11, 12 the workholding members 44, 45 move downwardly and engage the side portions of the sheet material 13 and clamp the sheet material down against the workholder members 35, 36, respectively. Continued movement of the upper die member 11 causes the workholder members 44, 35 and 45, 36 to move downwardly against the biasing force of the fluid spring members 25, 26 causing the lateral surface edge of the material 13 to be bent downwardly. The fluid spring members 25, 26 yieldably resist the movement of the members 35, 36 relative to the support member 20 and the die member 23.

As the upper die means 11 continues to move downwardly relative to the lower die means 12, the die member 50 engages the sheet material 13 centrally thereof and further downward movement of the die member 11 causes the sheet material 13 to be moved down into the recess 24 of the lower die member 23. The fluid spring members 51, 52 will provide a cushioning force so that the die member 50 smoothly and yieldably engages the sheet material. Moreover, the fluid springs 51 and 52 will yieldably resist relative movement between the die member 50 and the workholder members 44, 45 as well as the support member 40. If the upper die means 11 moves beyond the point where the sheet material 13 is in engagement with the concave surface 24 of the lower die member 23, the fluid spring members 51, 52 will permit the outer workholder members 44, 45 to move relative to the die member 50.

The fluid spring members 25, 26, 51 and 52 are of the self-aligning type and identical in construction, and thus only the fluid spring 52 will be described herein in detail. The fluid spring 52 comprises the cylinder member 54 having a finished bore 61 therein. The cylinder 54 is provided with cylinder heads 62 and 63 which are suitably secured to opposite ends of the cylinder 54. A non-guided piston head 64 is fitted to the bore 61 of the cylinder 54 and is connected to the piston rod 56 and normally lies in a plane which extends at angle of 90° to the axis of the cylinder 61. A fluid pressure is provided in the cylinder 54 biasing the piston head and piston rod to move downwardly and outwardly of the cylinder. The piston head 64 is moved axially of the cylinder 54 within the bore 61 in one direction, namely downwardly by the fluid pressure and is moved in the reverse direction against the fluid pressure by the above described relative movement of die members.

The piston rod 56 is positioned centrally in the cylinder 54 and extends axially thereof. The piston rod 56, as viewed in FIG. 3 of the drawings, extends from a surface 65 of the piston head 64 through a passageway or bore 67 in the cylinder head 62. The piston head 64 is provided with axially spaced annular skirt portions 75, 76 which encircle the peripheral edges of piston head and project radially beyond the peripheral surface of the piston head 64. The spaced skirt portions 75, 76 provide a channel in the periphery of the piston head 64. A ring 77 of elastically deformable material is positioned in the channel with the skirt portion 76 forming a backing or backstop member therefor and the skirt portion 75 providing a front stop member therefor. The ring 77 engages the bore 61 of the cylinder 54 and comprises a sealing means providing fluid tight contact between the piston head 64 and the bore 61. Moreover, the sealing ring 77 of the preferred embodiment supports the weight of the piston head and piston rod.

The ring 77 comprises a base or heel portion 78 and a U or cup-shaped portion 79 facing the fluid pressure chamber of the cylinder. The U-shaped portion 79 includes a flange portion 80 which extends outwardly from the base portion. The flange portion 80 engages the bore 61 of the cylinder 54 and provides a fluid tight contact therebetween. The base or heel portions 78 preferably are cylindrical in their natural configuration and preferably have an outside diameter slightly smaller than the inside diameter of the cylinder 54 to provide a slight clearance when the piston head is coaxial with the cylinder. The base, or heel portion, will however, bear against the cylinder to support the piston head as a side thrust is applied to the piston. The base portion and the flange portion of the sealing ring 78 are preferably made of a suitable elastically deformable material having the properties of firmness and high resistance to abrasion. Numerous materials may be used for this purpose but preferably resilient plastic material such as a polyurethane compound marketed under the trademark "Disogrin" is utilized.

Since the ring 77 is elastically deformable, the cross section of heel portion 78 will deform and the piston head 64 may tilt within the cylinder bore 61 to vary the angle that the piston head makes with the axis of the bore. The resiliency of the heel portion 78 is not as great as that of the flange portion 80 since the U-shaped portion 79 provides greater resiliency as well as an area for the fluid pressure in the cylinder to act against and urge the flange portion 80 into sealing engagement with the cylinder.

When the inner end of the piston rod 56 is moved laterally of the axis of the cylinder 54, the heel portion 78 of the sealing ring 77, which is moved toward the cylinder wall, bears first against the cylinder bore in the direction of thrust and then deforms to allow the piston head to cock or tilt in the cylinder bore. It will be noted, however, that the cocking or tilting is controlled since the piston head is fixed to the end of the piston rod. Otherwise the piston head would be free to cock in response to pressure in the cylinder and jamming would be a problem. A tilted position of the piston is shown in FIG. 3 in dot-dash lines. The tilting of the piston head does not break the seal between the cylinder and the head since the sealing flange portion 80 of the sealing ring 77 is continuously urged outwardly into engagement with the cylinder bore 61 by the pressure in the cylinder chamber and by their molded flare contour which maintains a seal between the cylinder bore and the piston head when a pressure is acting on the piston head.

When the line of movement of the member 50 relative to the member 40 and the axis of the cylinder 54 are misaligned, the outer end of the piston rod moves with its point of connection to the member 50 along the line of relative movement while the inner end of the piston rod tends to follow the axis of the cylinder 54. The rounded outer end of the piston rod 56 and conical seat 54a allows universal pivotal movement of the outer end of the piston rod relative to member 50, and since the piston head 64 is free to tilt in a universal manner about a point on the axis of the cylinder by reason of the ring 77, the inner end of the piston rod moves angularly in a universal manner relative to the cylinder axis. This compensates for misalignment of the line of movement of the member 50, and the axis of the cylinder and minimizes wear. The line of movement of member 50 and the axis of the cylinder being angularly disposed will intersect and lie in a common plane and the tilting of the piston head is in a direction parallel to the aforementioned plane.

To accommodate the aforementioned angular movement of the piston rod 56, the cylinder head 62, through which the rod passes, is provided with a floating sealing means 85 for the rod. The sealing means 85 encircles the piston rod 56 and is supported in the cylinder head 62 so that it will "float" or move with the piston rod when the latter is moved transversely of the axis of the cylinder bore 61. The sealing means 85 comprises a sealing ring 86 encircling the piston rod 56 in fluid-tight engagement with the periphery thereof and retaining means comprising an annular member 87 encircling the sealing ring 86.

The sealing means 85 is disposed in a cavity provided by an oversized counterbore 88 at the outer end of bore 67 in the cylinder head 62 through which the piston rod extends. The counterbore 88 is larger in diameter than the sealing means 85 and has a bottom 90 which extends perpendicular to the axis of the cylinder 61 and intersects the passageway 67. The sealing means 85 is held against the bottom 90 by a washer member 91 engaging the outer side of the sealing means 85 and held in place in the counterbore by a snap ring 92. The washer member 91 applies a compressing force to an O-ring 94 in the side of the member 87 facing the bottom 90 to assure a seal between the sealing means 85 and bottom 90.

As is apparent from the drawings, the sealing means 85, when centered on the axis of the cylinder does not engage the outer peripheral wall of the counterbore 88, but rather is spaced therefrom. Moreover, the sealing means 85, while held in the cavity by friction, will yield and move transverse to the axis of the cylinder 60 within the counterbore 88, and the O-ring 94 will maintain fluid-tight contact with the bottom of the counterbore 88 at all times. In the event of misalignment between the axis of the bore 61 and the line of movement of the member 50, the piston head 64 will tilt and the piston rod 56 will move relative to the cylinder head 62 in a direction transverse to the axis of the bore 61, as above described. This movement of the piston rod causes the sealing means 85 to move in the cavity perpendicular to the axis of the cylinder bore and yet maintain sealing engagement with the piston rod.

As described hereinabove, the fluid springs 25, 26, 51 and 52 resist relative movement of the respective die members and bias the die members to the position shown in FIG. 1. The resisting or biasing force is provided by fluid pressure in the pressure chamber of the cylinders of the fluid springs acting against the piston heads 64 of the fluid springs. The fluid system for providing the fluid pressure is a balanced pressure compressible fluid system having a limited volume of fluid. Preferably, it is an inert gas system and nitrogen is preferably used, while other fluids could be used. The fluid system includes a fluid supply or fluid reservoir tank 101 which is connected by single individual fluid conduits 102 to 105 to the fluid springs 25, 26, 51 and 52, respectively. The conduits 104, 105 extend through a suitable opening in the rib member 41.

The reservoir tank 101 is in the form of a suitable rechargeable tank which may be charged by adding fluid thereto through a suitable connection 106, and which includes a suitable pressure gauge 107. The fluid conduits 102 to 105 are connected to the tank 101 by suitable fluid connectors, and the tank 101 along with the conduits 102 to 105 and the chambers of the fluid springs provided a balanced pressure system wherein the pressure throughout the system is substantially the same. The fluid system is free of valves and any substantial restriction in the fluid conduits interconnecting the fluid springs and the tank 101, and no relief or check valves are required in the system as in a "resistance" system. The pressure in the system may be maintained at a sufficiently high level, for example from 200 to 250 p.s.i. upward.

The fluid system has a limited volume of fluid therein and may be termed "closed" or "sealed in" since the system is not continuously connected to a supply of fluid. In other words, the system is charged with a supply of fluid, and in the normal operation, no new fluid is added to the system as in the systems where a source of fluid is connected in the system. Thus, in a sense, the system may be called "closed" or "sealed in." Furthermore, in view of the fact that the system is free of valves and any substantial restrictions in the conduits interconnecting the fluid springs and the tank 101, no problem of heat dissipation is encountered. Moreover, since the system utilizes a compressible fluid, the size of the fluid conduits may be kept to a minimum since the volume of the fluid which flows from the fluid spring cylinder is less than in a system having a noncompressible fluid wherein, for movement of the piston head to occur, fluid must flow from the cylinder member in which the piston head moves. Furthermore, in view of the fact that the fluid pressure in the system is maintained at a relatively high level the size of the fluid springs may be made relatively small.

In the operation of the fluid system as described hereinabove it can be readily seen that the fluid is maintained in the conduits 102 to 105, the tank 101, and the pressure chambers of the fluid springs at substantially the same pressure. Upon relative movement between the die members, the fluid will be forced from the fluid chambers in the fluid springs through the fluid conduits into the reservoir and when the force providing the relative movement is released, fluid will flow through the same conduits from the tank into the fluid springs and the members associated therewith return to their normal position as shown in FIG. 1.

While the preferred embodiment of the present invention has been described hereinabove in considerable detail, the invention is not limited to the particular construction shown and it is my intention to cover hereby all adaptations, modifications, and uses thereof which come within the scope of the appended claims.

Having thus described my invention, what I claim is:

1. In combination, die apparatus for use in forming material comprising work engaging members including first and second die members, certain of said members being movable members constrained to move along a linear path relative to a cooperating member, a fluid spring associated with a respective one of said movable members and its cooperating member for applying a substantially constant force yieldably urging the movable member along said path toward engagement with the work, said spring comprising a cylinder member fixed to the respective cooperating member and having a bore therein with an axis extending substantially parallel to said path, a piston member operating in said bore, a piston rod operatively connected to said piston member and extending outwardly from one end of said cylinder member to engage the respective one of the movable members, said piston rod being mechanically free of the respective movable member for movement relative thereto along the axis of the rod in a direction away from the respective movable member and the outer end thereof contacting the outer side of the respective movable member and being movable angularly in a universal manner with respect thereto whereby the location of engagement of the movable member and piston rod may move along a path different from the axis of the cylinder during the yielding of the spring, means supporting said piston member in said cylinder member for universal angular movement relative to the cylinder member, and a closed system for supplying gas under high pressure to said cylinder comprising a reservoir tank charged with gas under high pressure and conduit means connecting said tank to said cylinder with the pressure through said tank, cylinder and conduit means being uniform.

2. In combination, die apparatus for use in forming material comprising work engaging members including first and second die members, certain of said members being movable with respect to a cooperating member and constrained to move along a linear path, a plurality of fluid springs each disposed between a respective one of said movable members and its cooperating member for applying a substantially constant force yieldable urging the respective movable member toward engagement with the work, each of said springs comprising: a cylinder member fixed to the respective cooperating member and having a bore therein with an axis extending substantially parallel to said path, a piston member operating in the cylinder member, a piston rod operatively connected to the piston member and extending outwardly from one end of the cylinder member to engage the respective movable member, and means supporting said piston member for universal angular movement relative to the cylinder member, said piston rod being mechanically free of the respective movable member for movement relative thereto along the axis of the rod in a direction away from the respective movable member and the outer end thereof contacting the outer side of the respective movable member and being movable angularly in a universal manner with respect thereto, whereby the location of engagement of the respective movable member and piston rod may move along a path different from the axis of the cylinder; and a closed system for supplying gas under high pressure to said cylinders comprising a reservoir tank charged with gas under high pressure and conduit means connecting said tank to each of said cylinders with the pressure throughout said tank, cylinders and conduit means being uniform.

3. In combination, die apparatus for use in forming material comprising work engaging members including first and second die members, certain of said members being movable members constrained to move along a linear path with respect to a cooperating member, a fluid spring associated with a respective one of said movable members and its cooperating member for applying a substantially constant force yieldably urging the movable member along said path toward engagement with the work, said spring comprising: a cylinder member fixed to the respective cooperating member and having a bore therein with an axis extending substantially parallel to the path of linear movement of said respective and cooperating members, a piston member operable in said bore, a piston rod operatively connected to said piston member and extending outwardly from one end of said cylinder member to engage the respective movable member, and means supporting said piston member for universal pivotal movement relative to the cylinder member, said piston rod being free of the respective movable member for movement relative thereto along the axis of the rod in a direction away from the respective movable member and the outer end thereof contacting the outer side of the respective movable member and being movable angularly in a universal manner with respect thereto, whereby the location of engagement of the respective movable member and piston rod may move along a path different from the axis of the cylinder; and a closed system for supplying an inert gas under high pressure to said cylinder comprising a reservoir tank charged with gas under high pressure of at least 200 p.s.i. and conduit means connecting said tank to said cylinder, the pressure throughout said system, cylinder and conduit means being uniform.

4. In combination, die apparatus for use in forming material comprising work engaging members including first and second die members, certain of said members being movable and constrained to move along a linear path with respect to a cooperating member, a plurality of fluid springs each disposed between a respective one of said movable members and its cooperating member for applying a substantially constant force yieldably urging the movable members toward engagement with the work, each of said springs comprising: a cylinder member fixed to the respective cooperating member and having a bore therein with an axis extending substantially parallel to said path of linear movement, a piston member operable in said bore, a piston rod operatively connected to said piston member and extending outwardly from one end of said cylinder member to engage the respective movable member, and means supporting said piston member for universal angular movement relative to the cylinder member; said piston rod being mechanically free of the respective movable member for movement relative thereto along the axis of the rod in a direction away from the respective movable member and the outer end thereof contacting the outer side of the respective movable member and being movable angularly in a universal manner with respect thereto, whereby the location of engagement of the respective movable member and piston rod may move along a path different from the axis of the cylinder; and a closed system for supplying an inert gas under high pressure to said cylinders comprising a reservoir tank charged with gas under pressure of at least 200 p.s.i. and conduit means connecting said tank to each of said cylinders with the pressure throughout said tank, cylinders and conduit means being uniform.

5. In combination, die apparatus for use in forming material comprising work engaging members including first and second die members, certain of said members being movable and constrained to move relatively along a linear path relative to a cooperating member, a plurality of fluid springs each disposed between a respective one of said movable members and its cooperating member for applying a substantially constant force yieldably urging the work engaging members toward engagement with the work, each of said springs comprising: a cylinder member fixed to the respective cooperating member and having a bore therein with an axis extending substantially parallel to the path of linear movement of said respective and cooperating members, a piston member operable in said bore, a piston rod operatively connected to said piston member and extending outwardly from one end of said cylinder member to engage the respective movable member, and means supporting the inner end of the piston rod for universal angular movement relative to the cylinder member, said piston rod being mechanically free of the respective movable member for movement relative thereto along the axis of the rod in a direction away from the respective movable member and the outer end thereof contacting the outer side of the respective movable member and being movable angularly in a universal manner with respect thereto, whereby the location of engagement of the respective movable member and piston rod may move along a path different from the axis of the cylinder; and a closed system for supplying gas under high pressure to said cylinder comprising a reservoir tank charged with gas under pressure of at least 200 p.s.i. and conduit means connecting said tank to said cylinders with the pressure throughout said tank, cylinders and conduit means being uniform.

References Cited by the Examiner
UNITED STATES PATENTS

| | | | |
|---|---|---|---|
| 98,839 | 1/70 | Ball | 78—40 |
| 1,486,911 | 3/24 | Messier | 267—65 |
| 1,626,051 | 4/27 | Rode | 113—46 |
| 1,655,568 | 1/28 | Rode | 267—1 |
| 2,348,160 | 5/44 | Thornhill | 267—64 |
| 2,815,254 | 12/57 | Soman et al. | 267—1 |
| 3,011,774 | 12/61 | O'Leary | 267—1 |
| 3,059,917 | 10/62 | Alinquant | 267—65 X |
| 3,094,335 | 6/63 | Shenk. | |
| 3,130,963 | 4/64 | Stegner | 267—1 |

ARTHUR LA POINT, *Primary Examiner.*